United States Patent
Emanuel et al.

(10) Patent No.: US 9,286,280 B2
(45) Date of Patent: Mar. 15, 2016

(54) UTILIZING CLASSIFICATION AND TEXT ANALYTICS FOR OPTIMIZING PROCESSES IN DOCUMENTS

(71) Applicant: International Business Machines Corporation, Armonk, NY (US)

(72) Inventors: Barton W. Emanuel, Manassas, VA (US); Robert J. Nonnenkamp, Germantown, MD (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 14/018,247

(22) Filed: Sep. 4, 2013

(65) Prior Publication Data

US 2015/0067466 A1 Mar. 5, 2015

(51) Int. Cl.
*G06F 17/00* (2006.01)
*G06F 17/24* (2006.01)
*G06F 17/22* (2006.01)

(52) U.S. Cl.
CPC .......... *G06F 17/241* (2013.01); *G06F 17/2211* (2013.01)

(58) Field of Classification Search
CPC .................................................... G06F 17/241
See application file for complete search history.

(56) References Cited

U.S. PATENT DOCUMENTS

| | | | |
|---|---|---|---|
| 6,909,805 B2 | 6/2005 | Ma et al. | |
| 7,162,465 B2 | 1/2007 | Jenssen et al. | |
| 7,558,778 B2 | 7/2009 | Carus et al. | |
| 7,558,792 B2 | 7/2009 | Bier | |
| 7,570,262 B2 | 8/2009 | Landau et al. | |
| 7,907,140 B2 | 3/2011 | Landau et al. | |
| 8,412,516 B2 | 4/2013 | Verma et al. | |
| 2004/0027349 A1 | 2/2004 | Landau et al. | |
| 2004/0034832 A1 | 2/2004 | Taylor et al. | |
| 2004/0068690 A1* | 4/2004 | Wood | G06Q 50/24 715/205 |
| 2006/0156222 A1* | 7/2006 | Chi et al. | 715/512 |
| 2007/0294614 A1* | 12/2007 | Jacquin | G06F 17/2247 715/230 |
| 2009/0216562 A1* | 8/2009 | Faulkner | G06F 19/322 705/3 |
| 2009/0216715 A1 | 8/2009 | Dexter | |
| 2009/0271696 A1* | 10/2009 | Bailor | G06Q 10/10 715/229 |
| 2009/0326926 A1 | 12/2009 | Landau et al. | |
| 2012/0191740 A1 | 7/2012 | Moehrle | |
| 2013/0013999 A1* | 1/2013 | Kerry-Tyerman et al. | 715/230 |
| 2014/0019438 A1* | 1/2014 | Le Chevalier et al. | 707/722 |
| 2015/0019207 A1* | 1/2015 | Dou | G06F 17/273 704/9 |

FOREIGN PATENT DOCUMENTS

EP 1304625 7/2005

\* cited by examiner

*Primary Examiner* — Keith Bloomquist
(74) *Attorney, Agent, or Firm* — Gates & Cooper LLP

(57) ABSTRACT

Classification and text analytics are used to evaluate passages, extract text, identify concepts, and provide displayable and searchable notations to assist document editors in identifying and evaluating conflicting or duplicate directives (also called policies or rules) within a large document.

16 Claims, 5 Drawing Sheets

UTILIZING CLASSIFICATION AND TEXT ANALYTICS FOR OPTIMIZING PROCESSES IN DOCUMENTS

CROSS-REFERENCE TO RELATED APPLICATIONS

This application is related to application Ser. No. 13/710,025, filed on Dec. 10, 2012, entitled "Utilizing Classification and Text Analytics for Annotating Documents to Allow Quick Scanning" by Barton W. Emanuel, Mark W. Paulis, and Mark L. Roboff, which application is incorporated by reference herein.

BACKGROUND

1. Field of the Invention

The present invention relates generally to evaluating documents, and in particular, to a method, apparatus, and article of manufacture for utilizing classification and text analytics to evaluate passages, extract text, identify concepts, and provide displayable and searchable notations to assist document editors in identifying and evaluating conflicting or duplicative directives within a large document.

2. Description of the Related Art

As large operational documents grow, the human editors of these documents may find it more difficult to edit the directives in the documents without accidentally creating conflicting or duplicate directives. The document may also become too large for a human editor to consolidate and even too complicated for human readers to understand and follow the directives. A system to automatically highlight, organize, and search document directives would enable editors to eliminate duplicate, conflicting, or missing directives and increase business efficiency of editors and readers.

For example, many government agencies have a records classification manual. In many cases, this document has been edited over the course of decades to contain hundreds of pages and thousands of classification directives. The document is so large that readers find it difficult to follow the rules, and editors find it too challenging to consolidate the document. To tackle the problem, it is common for individuals to spend months or years of their career to specialize and become an expert in a single chapter of the document. This intensive human effort still does not correctly tackle the problem, as conflicts and duplicates still arise between chapters. Lead industry subject matter experts are not aware of an automated solution to this problem. Thus, an automated system to highlight duplicate and conflicting classification directives would enable the editors to accomplish in minutes what had previously taken them months to accomplish.

SUMMARY

A computer-implemented method provides the ability to analyze a document. A document is received/generated and text is extracted from a native form of the document. The document is separated into two or more physical sections. Using text analytics, one or more directives are identified within the text. Based on the directives, annotations are generated within the physical sections. The annotations are compared to identify duplicate annotations and conflicting annotations. The annotations and results of the comparison of the annotations are displayed in a searchable interface.

A computer program product analyzes a document. The computer program product is a computer readable storage medium having program code embodied therewith. The program code is executable by a device and performs various operations. The program code receives, by the device, the document. The program code extracts, by the device, text of the document from a native form of the document. The program code separates, by the device, the document into two or more physical sections. The program code identifies, by the device, using text analytics, one or more directives within the text. The program code generates, by the device, based on the one more directives, annotations within the two or more physical sections. The program code compares, by the device, the annotations to identify duplicate annotations and conflicting annotations. The program code displays, by the device, the annotations and results of the comparison of the annotations in a searchable interface.

BRIEF DESCRIPTION OF THE SEVERAL VIEWS OF THE DRAWINGS

Referring now to the drawings in which like reference numbers represent corresponding parts throughout.

DETAILED DESCRIPTION

Figure 1:
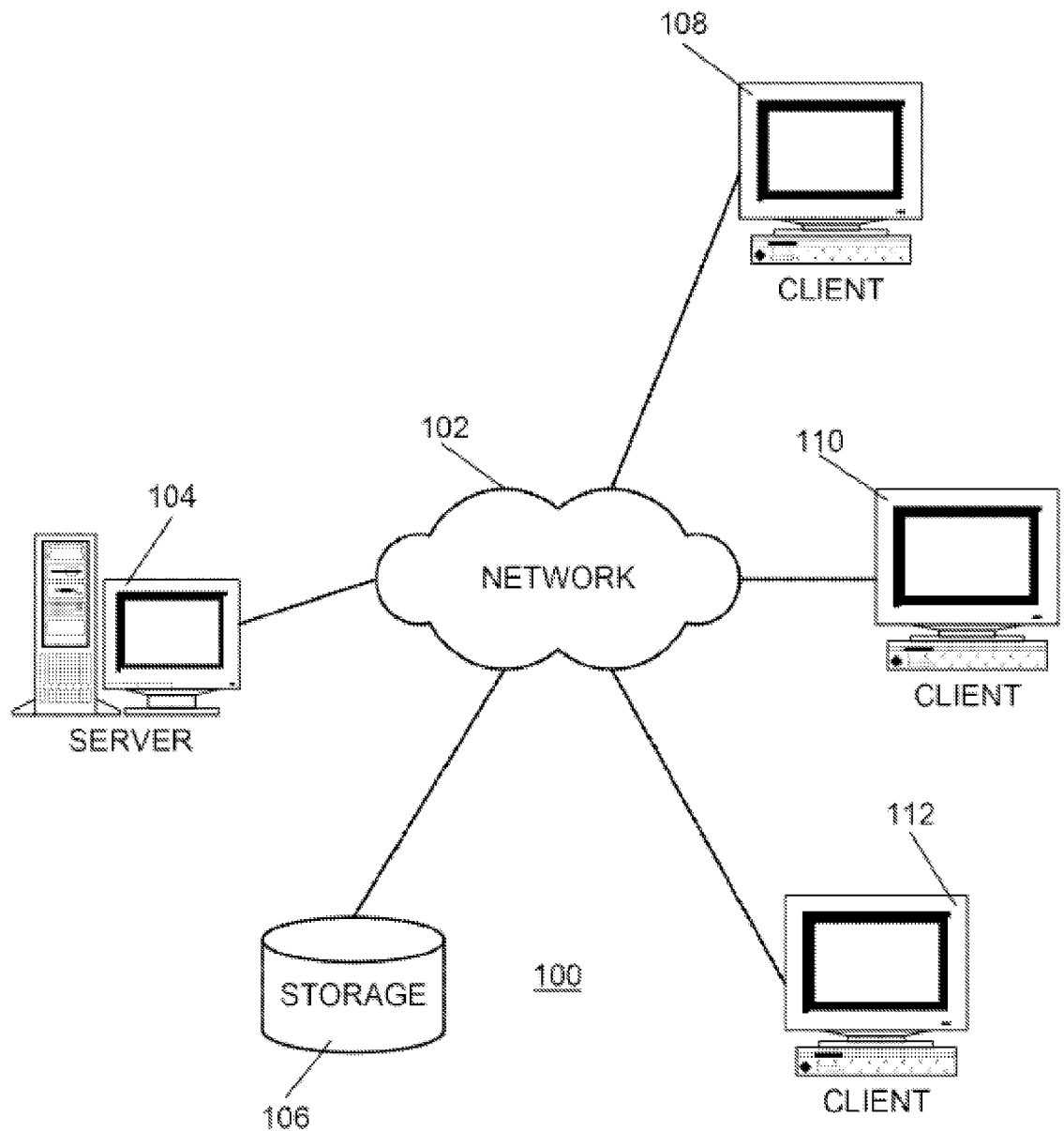
FIG. 1 illustrates a pictorial representation of a network data processing system used in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention use classification and text analytics to evaluate passages, extract text, identify concepts, and provide displayable and searchable notations to assist document editors in identifying and evaluating conflicting or duplicate directives (also called policies or rules) within a large document. Text analytics are first used to identify all directives located within the text of the document. A classifier is then used to determine the type of directive. A check is then performed for duplicate language, directive numbers, or important facts, so that an editor can quickly and easily identify duplicate, conflicting, and/or missing directives.

Hardware Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

With reference now to FIG. 1, a pictorial representation of a network data processing system 100 is presented in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and programs to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Figure 2:
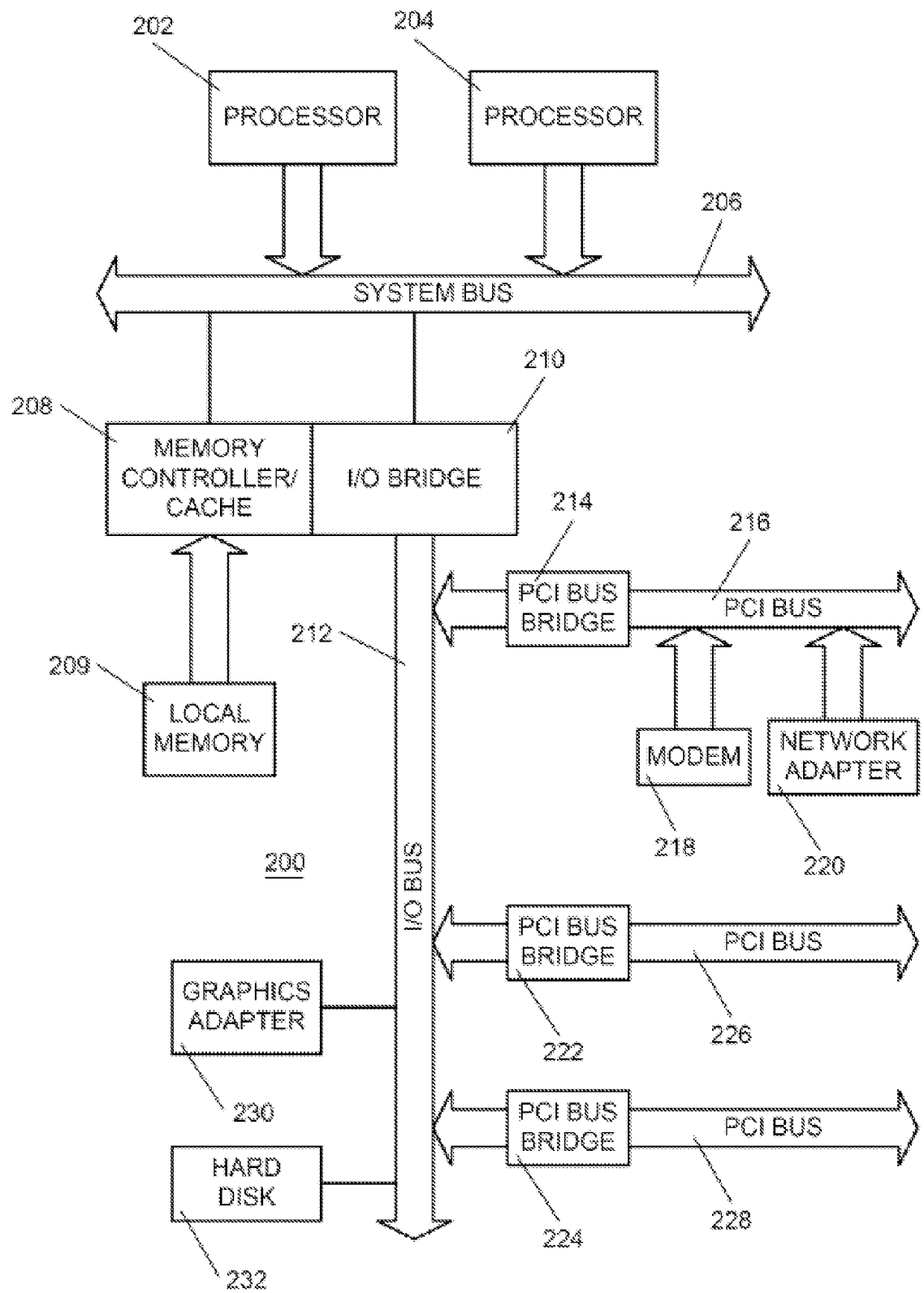
FIG. 2 illustrates a block diagram of a data processing system that may be implemented as a server in accordance with an embodiment of the present invention.

Referring to FIG. 2, a block diagram of a data processing system that may be implemented as a server, such as server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Server 104 may provide a suitable website or other internet-based graphical user interface accessible by users to enable user interaction for aspects of an embodiment of the present invention. In one embodiment, Netscape web server, IBM Websphere Internet tools suite, an IBM DB2 for Linux, Unix and Windows (also referred to as "IBM DB2 for LUW") platform and a Sybase database platform are used in conjunction with a Sun Solaris operating system platform. Additionally, components such as JBDC drivers, IBM connection pooling and IBM MQ series connection methods may be used to provide data access to several sources. The term webpage as it is used herein is not meant to limit the type of documents and programs that might be used to interact with the user. For example, a typical website might include, in addition to standard HTML documents, various forms, Java applets, JavaScript, active server pages (ASP), Java Server Pages (JSP), common gateway interface scripts (CGI), extensible markup language (XML), dynamic HTML, cascading style sheets (CSS), helper programs, plug-ins, and the like.

Figure 3:
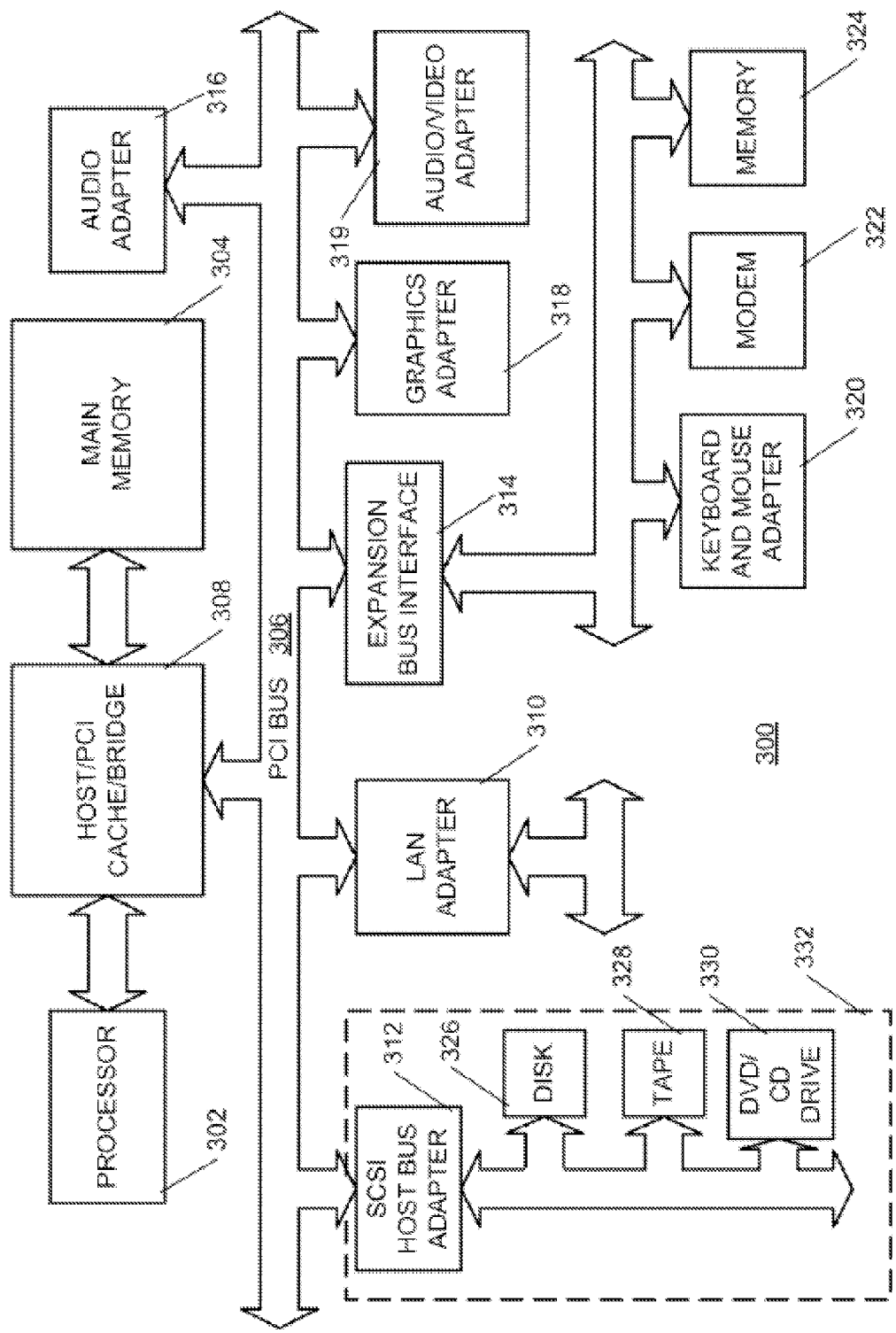
FIG. 3 illustrates a block diagram of a data processing system in accordance with an embodiment of the present invention.

With reference now to FIG. 3, a block diagram illustrating a data processing system is depicted in which aspects of an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP®, which is available from Microsoft Corporation. An object oriented programming system such as Java may run in conjunction with the operating system and provide calls to the operating system from Java programs or programs executing on data processing system 300. "Java" is a trademark of Sun Microsystems, Inc. Instructions for the operating system, the object-oriented operating system, and programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance. Further, the present invention may reside on any data storage medium (i.e., floppy disk, compact disk, hard disk, tape, ROM, RAM, etc.) used by a computer system. (The terms "computer," "system," "computer system," and "data processing system" and are used interchangeably herein.)

Software Embodiments

Figure 4:
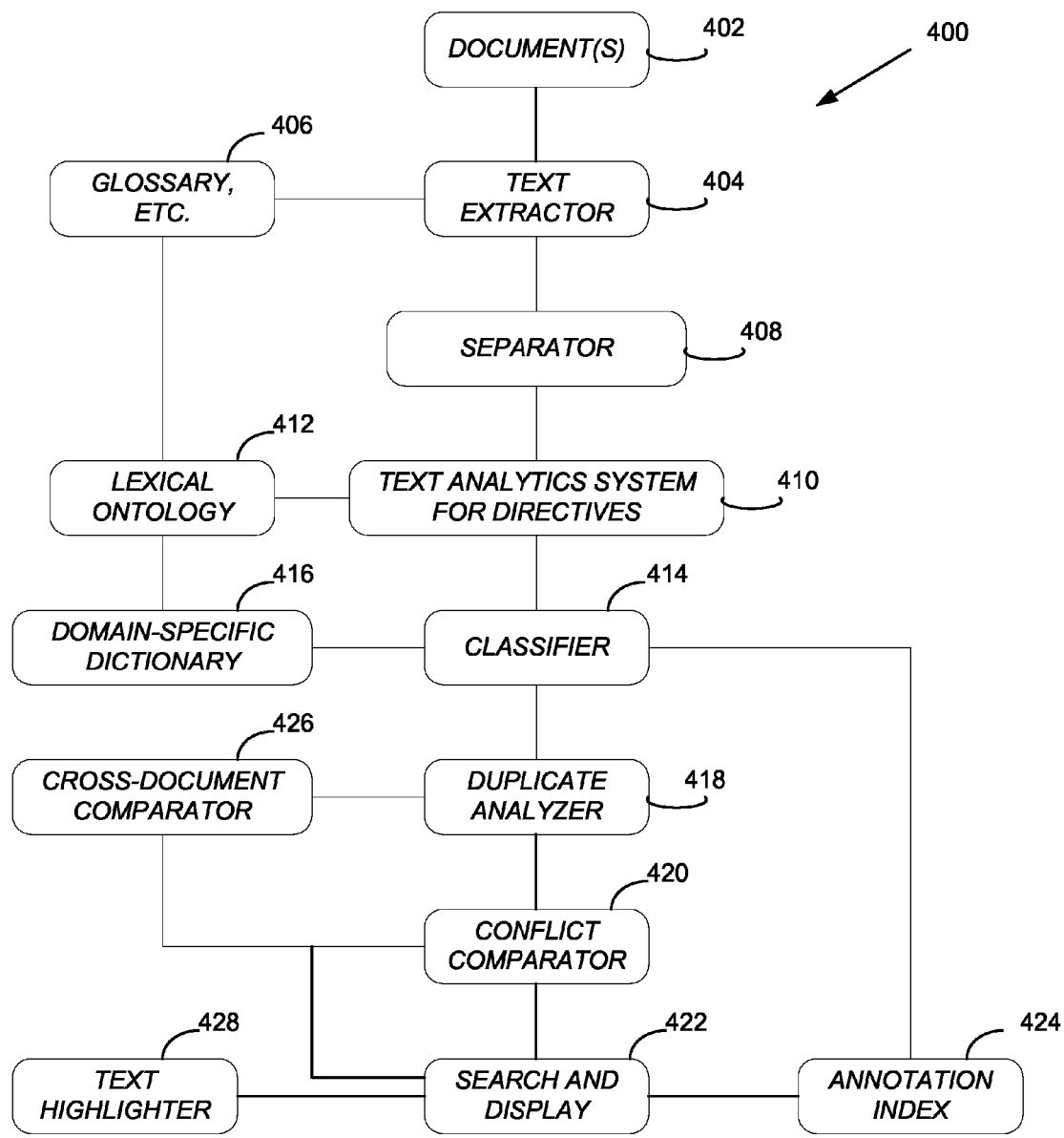
FIG. 4 illustrates a system used to annotate/analyze a document in accordance with one or more embodiments of the invention.

FIG. 4 illustrates a system 400 used to annotate/analyze a document in accordance with one or more embodiments of the invention. System 400 may be implemented by one or more servers 104, clients 108, 110, and 112, and/or any other components described above and set forth in FIGS. 1-3.

System 400 consists of a document 402, a text extractor 404 that may include the use of a corresponding glossary 406, a separator 408, a text analyzer 410 with a lexical ontology 412 for directives, a classifier 414 with a domain specific dictionary 416, a duplicate analyzer 418 and conflict comparator 420, a search (and display) server/interface 422 with a notation index 424, multi-document comparison 426, and a text highlighter 428.

Figure 5:
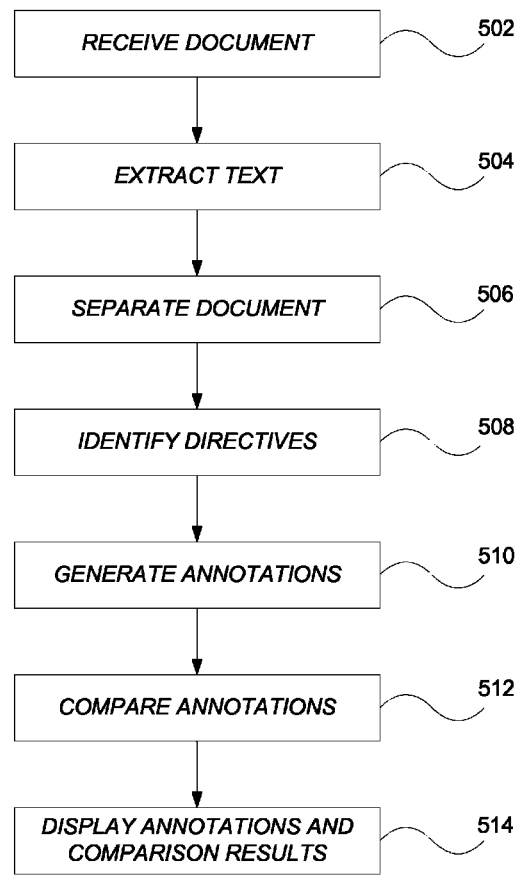
FIG. 5 illustrates the logical flow for analyzing a document in accordance with one or more embodiment of the invention.

FIG. 5 illustrates the logical flow for analyzing a document in accordance with one or more embodiment of the invention. The following description refers to the steps of FIG. 5 and the components of FIG. 4. For any given document 402, the steps of FIG. 5 may be performed. As set forth herein, the steps of FIG. 5 are performed by system 400 of FIG. 4 without user input. In other words, the evaluation and annotation of the document may be performed automatically, and dynamically, without user interference. Accordingly, human interaction with the system 400 is not needed as the system 400 automatically evaluates the text and annotates the documents without further user input and without relying on a base model established manually by other users.

At step 502, a document 402 is received/generated.

At step 504, a text extractor is used to extract the text of the document from the native document form (e.g., extract text from a PDF document). In addition, this step may include the extraction of a glossary 406 from within the document. Such a glossary may include a lexical ontology 412 and or a domain specific dictionary 416. Such a glossary 406 may be found at the end of the document being processed (although it may also exist in another related document being processed). The glossary 406 is utilized to improve the quality of a directive classification. In this regard, a lexical ontology 412 of the glossary 406 may be used by a text analyzer 410 to identify directives. Alternatively (or an in addition), the domain-specific dictionary 416 of the glossary 406 may be used by a classifier 414 to identify domain specific keywords within the text/annotations in order to group the annotations/text.

At step 506, a separator 508 is used to separate the document. Such a step may separate the document 502 into two or more physical sections. The manner in which the document 502 is separated may be configurable based on logical attributes of the document. For example, a user may configure the separator 408 to separate the extracted text based on paragraphs, carriage returns, pages, spaces, particular characters (e.g., semicolon), etc.

At step 508, directives in the text are identified using a text analytics system 410. A lexical ontology 412 may be used to identify directives in the extracted text. Such directives may be a policy or a rule. For example, if the document 402 is a government manual/guide, a policy/rule within a section/chapter of the manual may provide for destroying microfiche after three (3) years. The text analytics system 410 identifies such directives in the text.

At step 510, the output from the text analytics system 410 are annotations within the various physical sections. Examples of the annotations include (or may selected from a group consisting of) a part of speech, a phrase, a proper name, a location, a business entity, a domain specific keyword or concept, and a relationship referenced by any directives.

Step 510 may also include the classifier 414 classifying the annotations into groups based on one or more attributes of the directives. For example, annotations pertaining to directives that relate to the same topic may be grouped together (e.g., any directive that relates to microfiche, or all directives in a particular section/paragraph, etc.). The classifier may utilize a domain-specific dictionary 416 of glossary 406.

At step 512, the annotations are compared/analyzed. In this regard, the annotations may be indexed (resulting in an annotation index 424), and then compared for duplicate and/or conflicting annotations (e.g., using duplicate analyzer 418 and/or conflict comparator 420). For example, if the same document repeats the same three-month microfiche destruction directive, the duplicate analyzer 418 will identify such a duplicate directive. Similarly, if one directive provides for destroying microfiche in three months while a second directive provides for destroying microfiche in one year, the conflict comparator 420 will identify such a conflict.

The indexed annotations 424 may also be combined with annotations from other documents for the comparison 512 (e.g., for cross-document comparison 426). If the classifier 414 has classified the annotations into various groups, the comparison may also be based on such groups (e.g., comparing annotations within the same group, or by comparing groups to each other, etc.).

At step 514, the annotations and results of the comparison are displayed in a searchable interface (e.g., via a search and display server 422) that may include text highlighting 428 to easily identify the location of annotations and directives (and/or relevant annotations and directives) in the text. Thus, text containing directives or an annotation (e.g., duplicates or conflicting) may be highlighted or displayed in a visually distinguishable manner (e.g., different font, font size, color, etc). The user may also have the option to display or not display such a highlighting or to display/not display annotations with certain properties/attributes (e.g., conflicting or duplicate).

In addition to the above, the comparing step 512 and display step 514 may be performed dynamically while a document is being edited. For example, if a user is editing a government manual, and entering information about how to handle microfiche, the system 400 may dynamically determine that other directives relating to microfiche already exist in a different section of the manual, and display information relating to such an existing directive. Alternatively, the system 400 may perform such a comparison 512 and displaying 514 once the editing is complete.

In view of the above, embodiments of the invention provide the ability to extract text from a document, separate/chop up the text into various sections, use text analytics to extract/identify important portions of the text and output annotations, classify the annotations into various groups, determine if there are any duplicate and/or conflicting directives/annotations, and display results of such a determination/comparison.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide the ability to use classification and text analytics to evaluate passages, extract text, identify concepts, and provide displayable and searchable notations to assist document editors in identifying and evaluating conflicting or duplicated directives (also called policies or rules) within a large document. Text analytics are first used to identify all directives located within the text of a document. A classifier may then be used to determine the type of directive. The results are then checked for duplicate language, directive numbers, or important facts, so that an editor can quickly and easily identify duplicate, conflicting, or missing directives. Thus, embodiments of the invention may operate on a single document to separate the document into physical sections and then apply text processing techniques to those sections (e.g., allowing a single document to be compared to itself and improved, such as automatically finding redundant and duplicate concepts in the document).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer program product for analyzing a document, the computer program product comprising a non-transitory computer readable storage medium having program code embodied therewith, the program code executable by a device to:
   receive, by the device, the document;
   extract, by the device, text of the document from a native form of the document, wherein the text of the document comprises a glossary including a lexical ontology;
   separate, by the device, the document into two or more physical sections;
   identify, by the device, using text analytics on the lexical ontology of the glossary and without user-input, one or more directives within the text;
   generate, by the device, based on the one or more directives, one or more annotations within the two or more physical sections;
   compare, by the device, the annotations to identify duplicate annotations and conflicting annotations within the text; and
   display, by the device, the annotations and results of the comparison of the annotations in a searchable interface.

2. The computer-program product of claim 1, wherein the program code, that separates the document into two or more physical sections, is configurable based on one or more logical attributes of the document.

3. The computer-program product of claim 1, wherein the one or more directives comprise a policy.

4. The computer-program product of claim 1, wherein the one or more directives are based on and selected from a group consisting of a part of speech, a phrase, a proper name, a location, a business entity, a domain specific keyword or concept, and a relationship referenced by one of the one or more directives.

5. The computer-program product of claim 1, wherein the program code is further executable by the device to:
   extract, by the device, a glossary within the one or more documents to be used for identifying the one or more directives.

6. The computer-program product of claim 1, wherein the program code is further executable by the device to:
   classify, by the device, the annotations into groups based on one or more attributes of the directives; and
   wherein the program code compares the annotations based on the groups.

7. The computer-program product of claim 1, wherein the program code is further executable by the device to:
   index, by the device, the annotations; and
   combine, by the device, the annotations with second annotations from another document; and
   wherein the program code compares the annotations by comparing the annotations with the second annotations.

8. The computer-program product of claim 1, wherein the program code is further executable by the device to:
   highlight, by the device, the text that contains one or more directives; and
   highlight, by the device, the text that contains one or more annotations.

9. The computer-program product of claim 1, wherein the program code compares and displays dynamically while the document is being edited.

10. A system for analyzing a document comprising:
    a text extractor configured to extract text of the document from a native form of the document, wherein the text of the document comprises a glossary including a lexical ontology;
    a separator configured to separate the document into two or more physical sections;
    a text analyzer configured to:
    identify, using text analytics on the lexical ontology of the glossary and without user-input, one or more directives within the text; and
    generate, based on the one or more directives, one or more annotations within the two or more physical sections;
    a comparator configured to compare the annotations to identify duplicate annotations and conflicting annotations within the text; and
    a searchable interface configured to display the annotations and results of the comparison of the annotations.

11. The system of claim 10, wherein the one or more directives comprise a policy.

12. The system of claim 10, wherein the one or more directives are based on and selected from a group consisting of a part of speech, a phrase, a proper name, a location, a business entity, a domain specific keyword or concept, and a relationship referenced by one of the one or more directives.

13. The system of claim 10, further comprising:
    extracting a glossary within the one or more documents to be used for identifying the one or more directives.

14. The system of claim 10, further comprising:
    classifying the annotations into groups based on one or more attributes of the directives; and
    wherein the comparing is further based on the groups.

15. The system of claim 10, further comprising:
    indexing the annotations; and
    combining the annotations with second annotations from another document; and
    wherein the comparing comprises comparing the annotations with the second annotations.

16. The system of claim 10, further comprising:
    highlighting the text that contains one or more directives; and
    highlighting the text that contains one or more annotations.

* * * * *